E. P. WHITE.
VEHICLE TIRE.
APPLICATION FILED OCT. 12, 1906.

945,115.

Patented Jan. 4, 1910.

Witnesses.
D. A. Pauberschmidt
George L. Chindahl

Inventor:
Edmond P. White.
By Luther L. Miller
Atty

UNITED STATES PATENT OFFICE.

EDMOND P. WHITE, OF CHICAGO, ILLINOIS, ASSIGNOR TO WHITE TIRE COMPANY, A CORPORATION OF NEW YORK.

VEHICLE-TIRE.

945,115.  Specification of Letters Patent. Patented Jan. 4, 1910.

Application filed October 12, 1906. Serial No. 338,542.

*To all whom it may concern:*

Be it known that I, EDMOND P. WHITE, a citizen of the United States, residing at Chicago, in the county of Cook and State of Illinois, have invented certain new and useful Improvements in Vehicle-Tires, of which the following is a specification.

This invention, as stated, relates to vehicle tires, and especially to pneumatic tires for automobile wheels.

One of the objects of this invention is the production of a tire-tread adapted to prevent skidding.

Another object of the invention is the production of a sectional tread for vehicle tires adapted to permit of readily replacing a damaged or worn section with a new section.

A further object of the invention is the production of a tire provided with a tread having no tendency to injure the roadway by suction or otherwise.

A further object is the production of a cover adapted to be applied to the outer casing of a tire to protect the tire proper from punctures and similar accidental injuries.

A further object is the provision of such a protective cover which shall be readily applicable to tires of the form now in common use.

Figure 1:
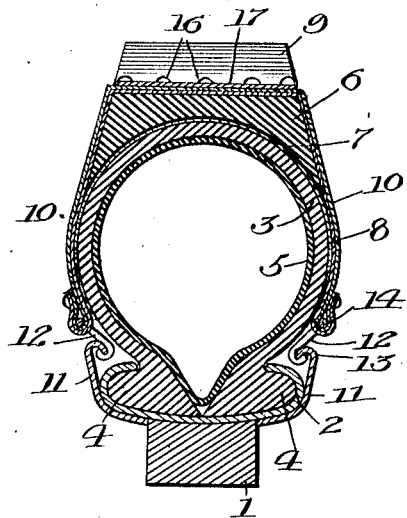
Figure 2:
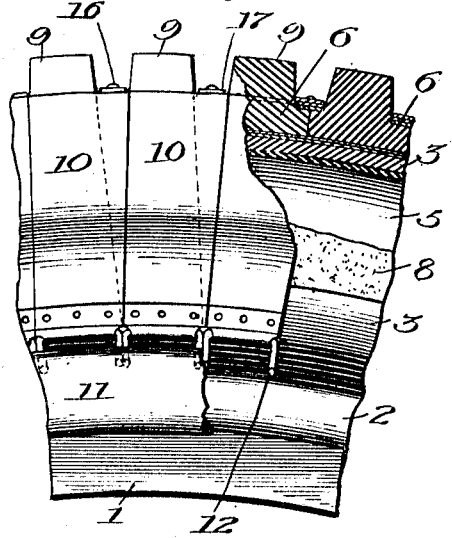
Figure 3:
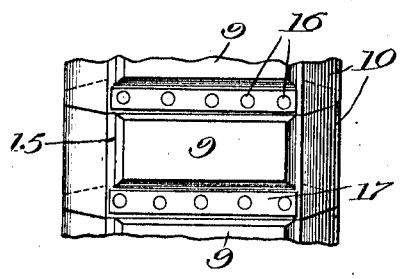
Figure 4:
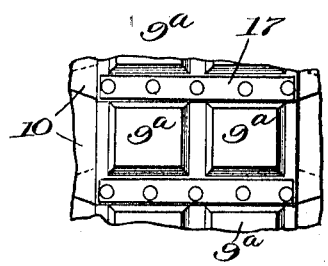
Figure 5:
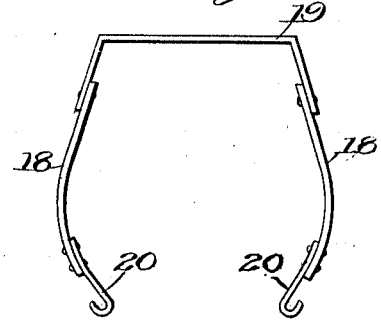

In the accompanying drawings Figure 1 is a transverse section through a tire and felly, illustrating some of the features of my invention. Fig. 2 is a fragmental side elevation of the tire and felly shown in Fig. 1. Fig. 3 is a fragmental outer peripheral view of said tire. Fig. 4 is a fragmental outer peripheral view illustrating an alternative form of tread surface. Fig. 5 is a detail view of a modified form of protective casing.

Referring to the drawings, 1 designates the felly and 2 a channel rim secured thereto in any suitable manner and extending about the periphery of the wheel. The tire casing 3 is secured to the wheel by means of flanges 4 on said casing lying within the overhanging walls of the channel rim 2, said tire casing being held in place by the pressure of the air within the inner tube 5 of the tire.

The tire casing 3 is provided with a wearing surface or tread consisting of blocks 6 of rubber or other suitable material, preferably possessing resiliency, said blocks having an inner surface 7 which is curved to conform to the periphery of the tire casing. The blocks 6 are adapted to abut side by side to form a series extending about the periphery of the tire, said blocks being cemented upon a strip of canvas or other suitable material 8, said strip being of a width sufficient to extend substantially halfway around the cross-sectional periphery of the tire casing. Upon their outer sides each of the blocks 6 is provided with a bearing portion 9 of substantially rectangular form, said bearing portion being of less width than the body of the block 6 so as to space the bearing portions apart. If desired, each of the blocks 6 may be provided with two bearing portions 9ª slightly separated from each other, as indicated in Fig. 4.

The blocks 6 are secured in place about the periphery of the tire by means of straps 10 formed of rawhide, fabric, or other suitable material, and being provided at their ends with means for engaging two flanges 11 extending one at each side of the wheel and lying in contact with the channel rim 2. In the form shown in Figs. 1 and 2, the engaging means for each end of each strap 10 consists of a piece of wire bent to provide hooks 12 adapted to engage the in-turned edge 13 of the flange 11, the bar 14 connecting said hooks lying within the folded and riveted end of said strap. Intermediate their ends the straps 10 extend over the blocks 6, said straps having openings 15 therein adapted to receive the portions 9 or 9ª of said blocks. The middle portions of the straps 10 are wider than the end portions, and the edges of the middle portions of adjacent straps overlap, as shown in Fig. 2. The overlapping portions are secured together by means of rivets 16 passing through said overlapping portions and a cleat 17 of steel or other suitable material. As will be seen, the straps 10 form a protective casing for the tire, adapted to protect it from accidental injuries.

The strap 10 may be formed of various materials, and in Fig. 5 I have shown a strap comprising leather side-portions 18 and a metallic middle portion 19 adapted to fit over the blocks 6. To the ends of the leather side-portions 18 are attached hooks 20 or other suitable means to engage the flanges 11.

In use, when it becomes necessary to replace a worn or damaged block 6, the tire is deflated, a sufficient number of straps 10 disengaged at one side from the flange 11, and the disengaged ends thrown over to the other side of the tire out of engagement with the blocks 6. The damaged block or blocks may now be stripped from the canvas 8 and new blocks cemented to said canvas. The straps 10 are then placed across the blocks and engaged with the flange 11, and the tire inflated to hold the protective casing and tread in place. It will be seen that the tread surface of the tire consists of a series of comparatively thick rubber bearing portions 9 or 9ª and steel cleats 17 alternating in position, thereby affording excellent protection against injury to the tire casing or inner tube. The rubber bearing portions 9 or 9ª being comparatively long (having reference to the width of the tire), skidding is prevented. The bearing portions 9 or 9ª being spaced apart, the tendency of the tire to cling to the roadway by suction, as do tires of the common form, is entirely obviated. The straps 10 constitute a protective casing which, in conjunction with the flanges 11, completely incloses the tire. The straps 10 may be made of materials which are strong and durable and not liable to puncture or cutting, such as raw-hide or sheet metal.

I claim as my invention:

1. A tread for pneumatic tires comprising resilient blocks each of a width to extend substantially from side to side of the tire and having a substantially flat outer surface and an inner surface curved to conform to the periphery of the tire casing, a resilient projection on the outer side of said blocks, and means for securing said blocks to the tire, said means comprising a series of overlapping elements having stiffened portions.

2. A tread for tires comprising resilient blocks having substantially flat outer surfaces, a resilient projection upon the outer side of each of said blocks, straps for securing said blocks to the tire, the middle portions of said straps overlapping, and transverse cleats overlying said overlapping portions and secured thereto between said projections.

3. A tire structure comprising a felly; a tire casing; a series of abutting resilient blocks forming a continuous, unbroken protective tread extending about the periphery of said casing, the inner surfaces of said blocks being curved to conform to the periphery of the tire casing; a strip to which the inner surfaces of said blocks are cemented; a resilient bearing projection on each of said blocks; straps; cleats for securing said straps at their middle portions, said straps having openings through which said bearing projections extend; hooks on the ends of said straps; and flanged members extending along said felly and adapted to be engaged by said hooks.

4. A tire structure comprising a felly; a tire casing; a series of abutting resilient blocks forming a continuous, unbroken protective tread extending about the periphery of said casing, the inner surfaces of said blocks being curved to conform to the periphery of the tire casing; a resilient bearing projection on each of said blocks; straps; cleats for securing said straps together at their middle portions, said straps having openings through which said bearing projections extend; hooks on the ends of said straps; and flanged members extending along said felly and adapted to be engaged by said hooks.

5. A tire structure comprising a felly; a tire casing; a series of abutting resilient blocks forming a continuous, unbroken protective tread extending about the periphery of said casing, the outer surfaces of said blocks being flat and the inner surfaces thereof being curved to conform to the periphery of the tire casing, said blocks being of a width to extend substantially from side to side of the tire casing; a resilient bearing projection on each of said blocks extending transversely of the tire; protective means overlying said blocks between said bearing projections; a leather covering for the sides of the tire casing, said covering extending from said blocks to a point adjacent to the felly; and means for securing the lower edges of said side coverings in place.

EDMOND P. WHITE.

Witnesses:
L. L. MILLER,
GEORGE L. CHINDAHL.